United States Patent [19]
Zitting et al.

[11] Patent Number: 4,717,160
[45] Date of Patent: Jan. 5, 1988

[54] HIGH PRESSURE ROTARY SHAFT SEAL

[75] Inventors: Gordon T. Zitting, Sandy; Jay T. Duke, West Valley City, both of Utah

[73] Assignee: Microdot Inc., Darien, Conn.

[21] Appl. No.: 853,879

[22] Filed: Apr. 21, 1986

[51] Int. Cl.⁴ .................... F16J 15/24; F16J 15/54; F16L 19/06; F16L 21/04
[52] U.S. Cl. ........................... 277/105; 277/102; 277/137; 277/189; 277/207 R; 285/340; 285/348; 285/351; 285/356
[58] Field of Search ............... 277/102, 105, 104, 105, 277/116.2, 137, 121, 123, 124, 125, 207 A, 118, 213, 207 R, 189, 235 R, 4, 101; 403/227, 372, 370; 285/338, 348, 346, 414, 368, 191, 196, 337, 339, 340, 351, 356; 411/545; 174/84 S, 89, 91, 23 R

[56] References Cited

U.S. PATENT DOCUMENTS

| | | | |
|---|---|---|---|
| 249,151 | 11/1881 | Allen | 411/545 |
| 324,574 | 9/1885 | Mars | 277/105 |
| 628,835 | 7/1899 | McDonald | 277/105 |
| 1,019,717 | 3/1912 | Lord | 285/337 X |
| 1,925,444 | 9/1933 | Grieshaber | 277/105 X |
| 2,029,072 | 1/1936 | Hughes | 277/137 X |
| 2,087,752 | 7/1937 | Carson et al. | 285/348 X |
| 2,197,450 | 4/1940 | Curtis | 277/105 X |
| 2,771,502 | 11/1956 | King et al. | 403/372 |
| 3,045,830 | 7/1962 | Fulton | 285/346 X |
| 3,231,286 | 1/1966 | Hennessy | 277/137 X |
| 3,442,518 | 5/1969 | Henshaw | 277/123 X |
| 3,649,034 | 3/1972 | Barton | 285/346 X |
| 3,703,297 | 11/1972 | Gignac | 285/346 X |
| 3,964,754 | 6/1976 | Murai et al. | 277/101 |
| 3,995,967 | 12/1976 | Haller | 403/372 X |
| 4,070,046 | 1/1978 | Felker et al. | 285/348 X |
| 4,406,467 | 9/1983 | Burger et al. | 277/105 |
| 4,476,772 | 10/1984 | Gorman et al. | 277/125 X |
| 4,560,176 | 12/1985 | Hoff | 277/118 X |

FOREIGN PATENT DOCUMENTS

| | | | |
|---|---|---|---|
| 124958 | 8/1947 | Australia | 277/106 |
| 229649 | 10/1963 | Austria | 277/125 |
| 1774 | of 1892 | United Kingdom | 277/105 |
| 19660 | of 1912 | United Kingdom | 277/106 |

*Primary Examiner*—Allan N. Shoap
*Attorney, Agent, or Firm*—Lyman R. Lyon

[57] ABSTRACT

A seal assembly for a shaft comprises one or more annular sealing elements having an initial internal diameter larger than the diameter of the shaft. The elements are deformed by a pair of annular backup rings disposed on opposite sides thereof. The backup rings have opposed axially extending undulations therein for effecting axial deformation and radial contraction of the sealing elements upon advancement of the backup rings toward one another.

4 Claims, 3 Drawing Figures

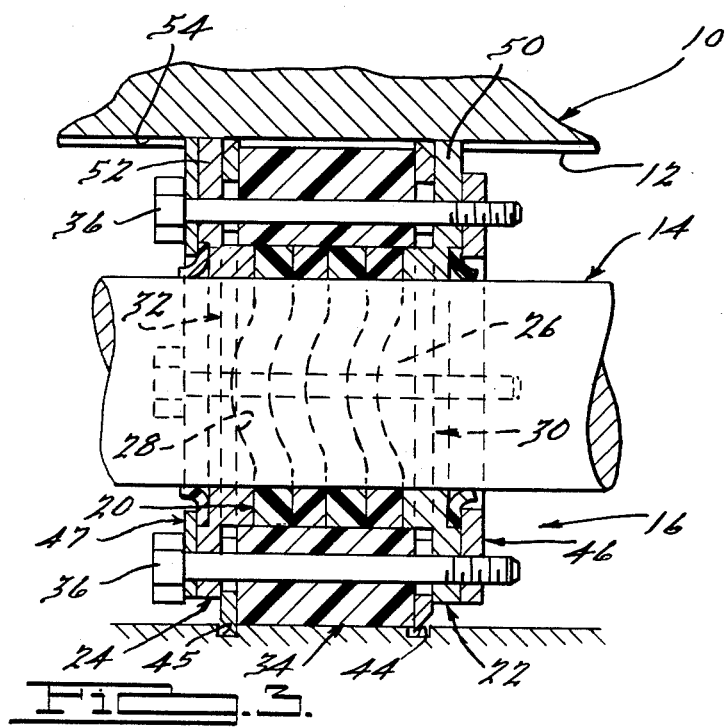
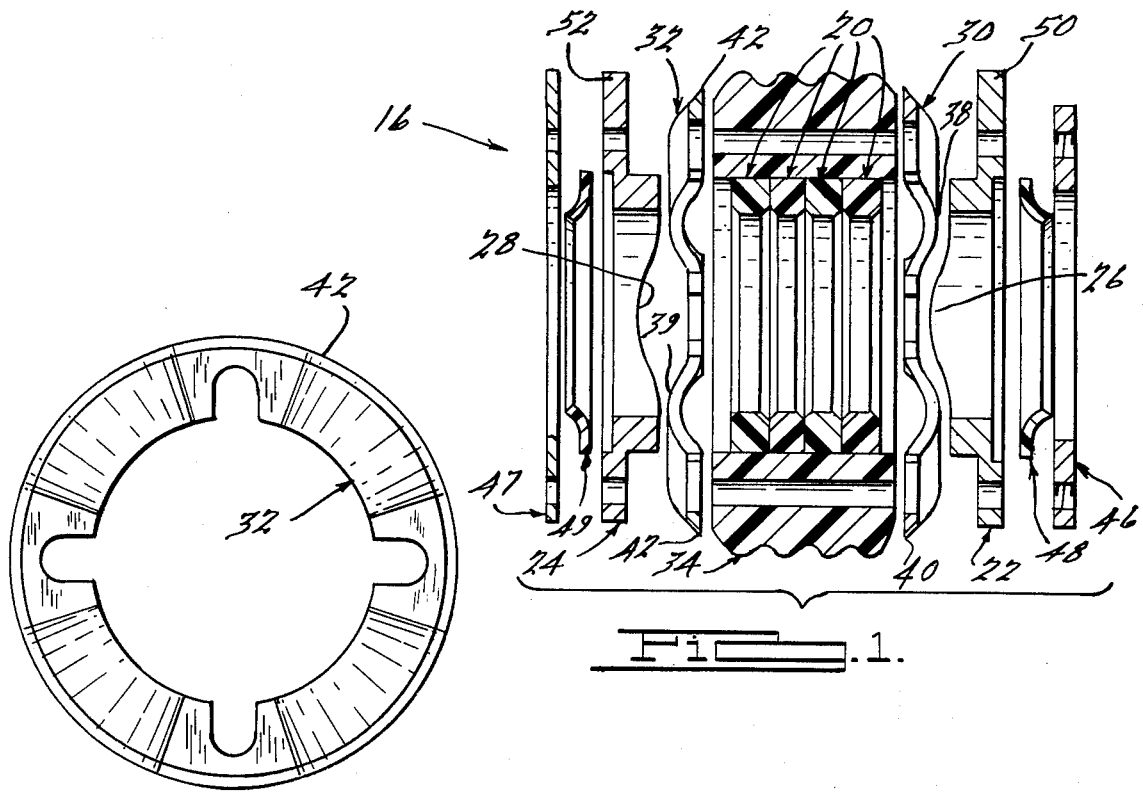

HIGH PRESSURE ROTARY SHAFT SEAL

BACKGROUND OF THE INVENTION

Performance of a rotary seal in high pressure applications can be increased by utilizing a serpentine configuration that increases the area of seal contact with the rotating shaft thereby reducing temperature build-up. In addition, use of a serpentine seal configuration results in a fluid dynamics geometry wherein fluid meets the seal at an angle and rides under the seal face due to rotation of the shaft, thus lubricating and cooling the sealing surface. Such a seal in conjunction with serpentine backup and loading devices is taught in U.S. Pat. No. 4,526,386, which is assigned to the assignee of the instant invention.

SUMMARY OF THE INVENTION

The invention relates to an improved high pressure rotary shaft seal of serpentine configuration that, in addition to the advantages discussed above, facilitates both installation of the seal over a shaft and into a seal housing without damage to the sealing elements. The seal is radially contractable and expandable to maximize sealing with a shaft and retention in a supporting bore, respectively.

BRIEF DESCRIPTION OF THE DRAWINGS

FIG. 1 is an exploded cross section through a seal assembly of the instant invention;

FIG. 2 is an elevational view of a retaining ring used in the assembly of FIG. 1; and FIG. 3 is a view, similar to FIG. 1, of an assembled seal.

DETAILED DESCRIPTION OF THE PREFERRED EMBODIMENT OF THE INVENTION

In accordance with a preferred and constructed embodiment of the instant invention, a seal housing 10 has an enlarged circular bore 12 therein for acceptance of a shaft 14. The shaft 14 is journaled by a seal assembly 16 that is mechanically retained in the bore 12 of the housing 10, as will be described.

In accordance with the present invention, the seal assembly 16 comprises one or more deformable elastomeric seal elements 20 which journal the shaft 14. The seal assembly 16 is initially telescoped over the shaft 14 without contact therewith for ease and safety of installation. Subsequently, the seal elements 20 are radially contracted into contact with the shaft 14 to effect a seal thereagainst.

More specifically, and in accordance with one feature of the instant invention, radial contraction of the seal elements 20 is effected by a pair of backup rings 22 and 24 which have one or more axially extending nesting undulations 26 and 28, respectively. As the backup rings 22 and 24 are drawn toward one another by tightening a plurality of machine screws 36, the seal elements 20 are deformed into the shape of the undulations 26 and 28 in the backup rings 22 and 24. Thus, the internal diameter of each of the seal elements 20, which initially is slightly larger than the shaft 14, is reduced as it conforms to the nesting undulations of the rings 22 and 24. As the two backup rings 22 and 24 move toward one another, sealing contact of the seal rings 20 against the shaft 14 is achieved.

In accordance with another feature of the instant invention, the seal assembly 16 is mechanically positioned in the bore 12 of the housing 10 by a pair of serpentine retaining rings 30 and 32 that are disposed between the backup rings 22 and 24 and on opposite sides of an intermediate bore sealing ring 34. As the seal assembly 16 is assembled by tightening of the plurality of bolts 36, serpentine or undulating portions 38 and 39 on the retaining rings 30 and 32, respectively, are flattened out causing the outside diameter thereof to expand radially outwardly, bringing sharp edges 40 and 42 thereon into engagement with the bore 12 or, alternatively, as seen in FIG. 3, into a pair of circumferential positioning grooves 44 and 45. Suitable washers 46 and 47 and dust seals 48 and 49 are provided to complete the seal assembly 16.

In accordance with yet another feature of the instant invention, radial expansion of the bore sealing ring 34 is achieved by axial compression of the retaining rings 30 and 32. The sealing ring thus exerts a radially inward bias on the seal elements 20 and a radially outward bias against the walls of the bore 12 in the housing 10.

It is important that the seal assembly 16 be positively positioned relative to the bore 12 so that rotation of the shaft 14 relative to the seal element 16 does not effect indexing of the seal assembly 16 relative to the housing, i.e., relative rotation between the seal assembly and the housing must be prevented. Accordingly, backup rings 22 and 24 are provided with radially extending locking fingers 50 and 52 that are accepted in a complementary groove 54 in the housing 10.

While the preferred embodiment of the invention has been disclosed, it should be appreciated that the invention is susceptible of modification without departing from the scope of the following claims.

I claim:

1. A seal assembly for a shaft extending through a bore in a housing, said seal assembly comprising
   an axially compressible, radially expandable annular shaft sealing means having an initial internal diameter equal to or larger than the diameter of said shaft,
   a pair of annular relatively hard inflexible backup rings disposed on opposite sides of said shaft sealing means, said backup rings having opposed axially extending undulations therein undulating along the circumference of the rings from one portion of the circumference to another for effecting axial deformation and radial expansion of said shaft sealing means upon advancement of said backup rings toward one another, and
   means connecting said backup rings to effect movement thereof toward one another.

2. A seal assembly in accordance with claim 1 including an annular bore sealing ring disposed about said shaft sealing means in radial alignment therewith, said bore sealing ring being axially compressible by said backup rings so as to be radially expandable against said bore and shaft sealing means, respectively, and
   a pair of retaining rings disposed between said backup rings and on opposite sides axially of said bore sealing ring, said retaining rings have axially extending undulations therein, respectively, that effect radial expansion of said retaining rings and engagement thereof with said housing within the bore upon compression of said undulations.

3. A seal assembly in accordance with claim 1 including a pair of retainer rings disposed between said backup rings and having compressible axially facing undulating radial face portions and radially facing relatively sharp edge portions that are radially expandable into biting engagement with said housing within the bore, said retaining rings being disposed on opposite sides axially of said seal means to stabilize said seal element against axial movement relative to said housing.

4. A seal assembly for a shaft that extends through a relatively larger bore in a housing, said seal assembly comprising
- an axially compressible, circumferentially expandable annular seal means,
- a pair of relatively hard inflexible backup rings on axially opposite sides of said seal means having undulating axially facing faces undulating along the circumference of the rings from one portion of the circumference to another to facilitate axial distortion and circumferential expansion of said seal element about said shaft,
- an annular bore sealing ring disposed radially outwardly of said seal means and movable radially outwardly upon axial compression thereof, said bore sealing ring being engageable with said sealing menas and the bore in said housing within the bore, and
- means engageable with said backup rings to effect movement thereof toward one another.

* * * * *